United States Patent
Ausseresse et al.

(10) Patent No.: US 11,018,592 B2
(45) Date of Patent: May 25, 2021

(54) FLYBACK CONVERTER CONTROLLER, FLYBACK CONVERTER AND METHODS OF OPERATION

(71) Applicant: Infineon Technologies Austria AG, Villach (AT)

(72) Inventors: Pierrick Ausseresse, Munich (DE); Alfredo Medina-Garcia, Munich (DE); Joerg Peter Oehmen, Reimerling (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/980,922

(22) Filed: May 16, 2018

(65) Prior Publication Data
US 2018/0337606 A1 Nov. 22, 2018

(30) Foreign Application Priority Data
May 19, 2017 (DE) .................. 10 2017110 927.7

(51) Int. Cl.
*H02M 3/335* (2006.01)
*H02M 3/158* (2006.01)
*H02M 1/00* (2006.01)

(52) U.S. Cl.
CPC ....... *H02M 3/3353* (2013.01); *H02M 3/1588* (2013.01); *H02M 3/33507* (2013.01); *H02M 2001/0058* (2013.01)

(58) Field of Classification Search
CPC ......... H02M 2001/0058; H02M 3/335; H02M 3/33569; H02M 7/53; H02M 7/537; H02M 7/53846; H02M 7/53862; H02M 2007/4811; H02M 2007/4815; H02M 2007/4818
See application file for complete search history.

(56) References Cited

U.S. PATENT DOCUMENTS

| | | | | |
|---|---|---|---|---|
| 5,325,283 A * | 6/1994 | Farrington | ............ | H02M 3/335 363/132 |
| 6,069,801 A * | 5/2000 | Hodge, Jr. | .......... | H02M 1/4225 363/21.02 |
| 9,780,642 B2 * | 10/2017 | Skinner | ............ | H02M 3/33507 |
| 2006/0098464 A1 | 5/2006 | Osaka et al. | | |
| 2013/0033248 A1 * | 2/2013 | Granger | ............. | H02M 3/1588 323/288 |
| 2014/0098572 A1 * | 4/2014 | Scarlatescu | ....... | H02M 3/33546 363/16 |
| 2014/0225439 A1 * | 8/2014 | Mao | ..................... | H02M 3/3376 307/31 |
| 2017/0207708 A1 * | 7/2017 | Hari | .................. | H02M 3/33507 |

FOREIGN PATENT DOCUMENTS

GB          2524065 A *    9/2015    .............. H02M 1/36

OTHER PUBLICATIONS

Office action, application No. 10 2017 110 927.7, dated Jan. 22, 2018, pp. 10.

* cited by examiner

*Primary Examiner* — Gary L Laxton
(74) *Attorney, Agent, or Firm* — Armis IP Law, LLC

(57) ABSTRACT

Flyback converters and corresponding methods are provided. In an implementation, an on-time of a low-side switch of the flyback converter is kept at half a resonance period of a resonance defined by a leakage inductance of a transformer of the flyback converter and a capacitance value of a capacitor coupled to a primary winding of the transformer. Other methods, controllers and flyback converters are also provided.

21 Claims, 11 Drawing Sheets

FLYBACK CONVERTER CONTROLLER, FLYBACK CONVERTER AND METHODS OF OPERATION

RELATED APPLICATION

This application is related to and claims priority to earlier filed German Patent Application Serial Number 102017110927.7 entitled "FLYBACK CONVERTER CONTROLLER, FLYBACK CONVERTER AND METHOD OF OPERATING THE FLYBACK CONVERTER,", filed on May 19, 2017, the entire teachings of which are incorporated herein by this reference.

BACKGROUND

Flyback converters are a type of voltage converters which provide galvanic isolation between an input and any output. A specific type of flyback converter is an assymetric pulse width modulation (PWM) half bridge flyback converter, referred to as APWM HB flyback converter herein. A APWM HB flyback converter is essentially a converter with an inductor of the converter being split to form a transformer, such that voltage ratios are multiplied based on a winding ratio of the transformer with an additional advantage of isolation.

In some implementations, a half bridge comprising a high-side switch and a low-side switch is used to operate the converter.

Such switches are often implemented as transistors, for example metal oxide semiconductor (MOS) field effect transistors (FET). In some implementations, such field effect transistors have parasitic capacitances. If such a switch is switched with a voltage applied to it, the capacitance is charged, and in the switching event this charge may be lost leading to overall losses of the converter.

Furthermore, flyback converters in many applications, for example power supplies, should maintain a regulated output voltage with a wide input voltage range (for example to adapt to mains voltages in different countries), for example from 90 V AC (alternating current) up to 264 V AC. In some applications, it may also be desirable to be able to provide different output voltages.

BRIEF DESCRIPTION

According to an embodiment, a method for operating a flyback converter is provided, comprising: operating a high-side switch and a low-side switch of the flyback converter, and keeping an on-time of one of the low-side switch or high-side switch essentially at or above half a resonance period of an LC resonant circuit of the flyback converter.

According to another embodiment, a method is provided, comprising: operating a high-side switch and a low-side switch of a flyback converter, and increasing a capacitance coupled to a primary winding of a transformer of the flyback converter for lower output voltages compared to the capacitance at higher output voltages.

According to another embodiment, a controller including a control logic to implement such methods and a flyback converter comprising such a controller are provided.

According to yet another embodiment, a flyback converter is provided, comprising: a high-side switch, a low-side switch, the high-side switch and the low-side switch coupled in series between a voltage input and a reference voltage, a transformer, wherein a first end of a primary winding of the transformer is coupled to a node between the high-side switch and the low-side switch, and a capacitor coupled to the primary winding, wherein the capacitor is a variable capacitor configured to vary its capacitance based on a required output voltage of the flyback converter.

According to yet further embodiments, a method of operating a flyback converter includes: operating a switch coupled to the flyback converter; and controlling an on-time of the switch above half of a resonance period of an LC resonant circuit of the flyback converter to produce an output voltage.

In one embodiment, controlling the on-time of the switch above half of the resonance period further comprises: controlling the on-time of one of the switch to be between 70% and 160% of half the resonance period to produce the output voltage.

In yet further embodiments, the switch is a first switch, the method further comprising: controlling the on-time of the switch to be constant; and regulating the output voltage of the flyback converter by changing an on-time of a second switch coupled to the flyback converter.

In still further embodiments, the on-time of the switch and a dead time in which both the first switch and the second switch are simultaneously off is selected to provide zero voltage switching.

Further embodiments herein include varying a magnitude of capacitance coupled to a primary winding of the transformer depending on a required magnitude of the output voltage.

Yet further embodiments include varying the on-time of the switch when the magnitude of capacitance is varied to provide a half resonance period of the LC resonant circuit.

In one embodiment, the LC resonant circuit comprises: a leakage inductance of a transformer of the flyback converter, a capacitor coupled to a primary winding of the transformer, an additional inductor.

A further method according to embodiments herein includes: controlling operation of a switch coupled to a flyback converter to produce an output voltage, the flyback converter including a transformer; and adjusting a magnitude of a capacitance of a capacitor coupled to a primary winding of the transformer of the flyback converter depending on a magnitude of the output voltage.

In one embodiment, the method further includes controlling a voltage applied to the capacitor to adjust the magnitude of the capacitance of the capacitor.

In one embodiment, the method further comprises: activating an additional capacitor when the magnitude of the output voltage is below a predefined threshold value. Activating the additional capacitor can include activating a transistor switch coupled in series to the capacitor.

Further embodiments herein include a flyback converter controller comprising: a first output to output a first control signal for a high-side switch of the flyback converter; a second output to output a second control signal for a low-side switch of the flyback converter; and a control logic circuit, the control logic circuit adapted to control the flyback converter to: control a switch coupled to the flyback converter; and control an on-time of the switch above half of a resonance period of an LC resonant circuit of the flyback converter to produce an output voltage.

The flyback converter further comprises a controller, a high-side switch coupled to first output of the controller, a low-side switch coupled to a second output of the controller, a transformer coupled to a node between the high-side switch and the low-side switch, and a capacitor coupled to a primary winding of the transformer.

In one embodiment, a leakage inductance of the transformer, the capacitance and/or an additional inductance define the resonance period.

In accordance with yet further embodiments, a flyback converter comprises: a high-side switch; a low-side switch, the high-side switch and the low-side switch coupled in series between an input voltage and a reference voltage; a transformer, a first end of a primary winding of the transformer coupled to a node between the high-side switch and the low-side switch; and a capacitor coupled to the primary winding, a magnitude of a capacitance of the capacitor varying depending on a magnitude of an output voltage produced by the flyback converter.

In one embodiment, the magnitude of the capacitance decreases with an increasing voltage applied to the capacitor.

The variable capacitance comprises a first capacitance coupled to an end of the primary winding; and a series connection of a further switch and a second capacitor coupled in parallel to the first capacitor to the end of the primary winding.

In yet further embodiments, the flyback converter includes: a controller to control the further switch when a required output voltage of the flyback converter is below a predefined threshold value.

In accordance with further embodiments, the flyback converter includes a rectifier circuit coupled to the high-side switch. The above brief description is merely intended to give a brief overview over some aspects of some embodiments and is not to be construed as limiting. In particular, other embodiments may include other features than the ones explicitly given above. These and other more specific embodiments are disclosed in more detail below.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1A:
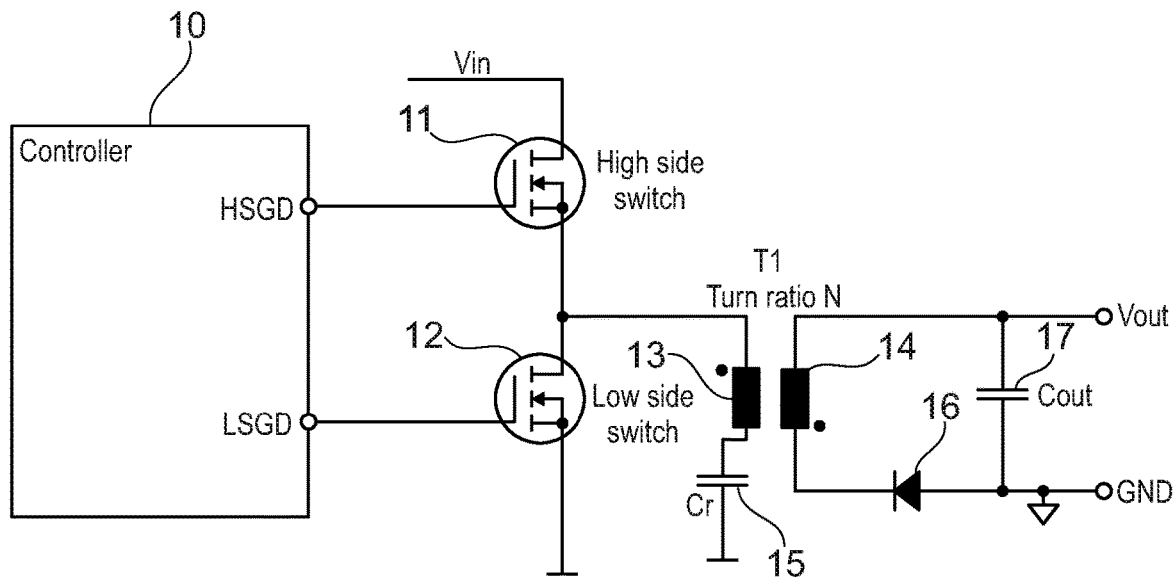
FIGS. 1A to 1C are circuit diagrams of APWM HB flyback converters according to some embodiments.

In the following, various embodiments will be described in detail referring to the attached drawings. These embodiments are given as examples only and are not to be construed as limiting in any way. For example, while embodiments may be described comprising a plurality of features or elements, this is not to be construed as limiting, and in other embodiments, some of the features or elements may be omitted, and/or may be replaced by alternative features or elements. In addition to the features or elements explicitly described, further features or elements, for example features or elements conventionally provided in flyback converter circuits like asymmetric pulse width modulation half bridge (APWM HB) flyback converter circuits, like protection mechanisms (e.g. overcurrent protection) or feedback control may be used.

Different embodiments may be combined with each other to form further embodiments unless noted otherwise. Variations and modifications described with respect to one of the embodiments may also be applicable to other embodiments.

In the embodiments shown and described, any direct electrical connection or coupling between elements, i.e. connections or couplings without intervening elements, may be replaced by an indirect connection or coupling, i.e. a connection or coupling comprising one or more additional intervening elements, and vice versa, as long as the general purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered.

Embodiments relate to flyback converters, controllers for flyback converters and associated methods. In particular, in some embodiments a controller may control a high-side switch and a low-side switch of a flyback converter such that an on-time of the low-side switch is kept essentially at or above half a resonance period of an LC resonator of the flyback converter, for example formed in part by a transformer leakage inductance of the flyback converter and a capacitor coupled thereto. In some cases this may prevent switching of the high side switch or low side switch while a considerable voltage is still present at its terminals (e.g. no voltage above 20V, but voltage may depend on application), so called ZVS and/or may improve performance of the flyback converter. In some embodiments, the on-time of the low-side switch is kept constant, while an output voltage is regulated by changing the on-time of the high-side switch. In embodiments described below, APWM HB flyback converters are used as examples, which is not to be construed as limiting.

In this respect, a switch is "on" or "closed" when it provides a low ohmic connection between terminals thereof, and is "off" or "open" in a state where it provides essentially and electric isolation between the terminals (apart possibly from some leakage currents). In some embodiments, transistors like field effect transistors, bipolar transistors or insulated gate bipolar transistors may be used as switches.

Turning now to the figures, FIG. 1A is a circuit diagram illustrating a APWM HB flyback converter according to an embodiment. The APWM HB flyback converter of FIG. 1A comprises a controller 10 controlling a high-side switch 11 and a low-side switch 12 via outputs HSGD, LSGD, respectively. In the embodiment shown, high-side switch 11 and low-side switch 12 are NMOS transistors. However, in other embodiments, other types of transistors may be used. High-side switch 11 and low-side switch 12 are coupled in series between a direct current (DC) input voltage Vin and a reference voltage, e.g. ground, as shown. High-side switch 11 and low-side switch 12 therefore form a half bridge.

In particular, controller 10 may be configured to control high-side switch 11 and low-side switch 12 according to techniques discussed in more detail further below.

A node between switches 11, 12 is coupled to a first end of a primary winding 13 of a transformer T1. A second end of primary winding 13 is coupled to ground via a capacitor 15 having a capacitance Cr.

Transformer T1 further comprises a secondary winding 14. A first end of secondary winding 14 is coupled to an output terminal to output a voltage Vout. A ground terminal GND is coupled to a second end of secondary winding 14 via a diode 16. Furthermore, an output capacitor 17 having a capacitance Cout is coupled between the output terminal and the ground terminal as shown, acting essentially as a filter.

A leakage inductance of transformer T1, in particular of primary winding 13, and capacitor 15 form an LC resonator which influences the behavior of the flyback converter of FIG. 1A as will be explained in more detail.

Transistor switches like switches 11, 12 may have a parasitic capacitance. Switching such a transistor from off to ON when a voltage is applied to it may cause electrical losses as the capacitor is discharged. Therefore, some embodiments aim at maintaining a switching of at least high-side switch 11—at a low voltage (at or near zero) applied to it, also referred to as zero voltage switching (ZVS). In some embodiments, this may be effected by controlling switches 11, 12 by controller 10 according to techniques disclosed herein, as will be explained further below in more detail.

Figure 1B:
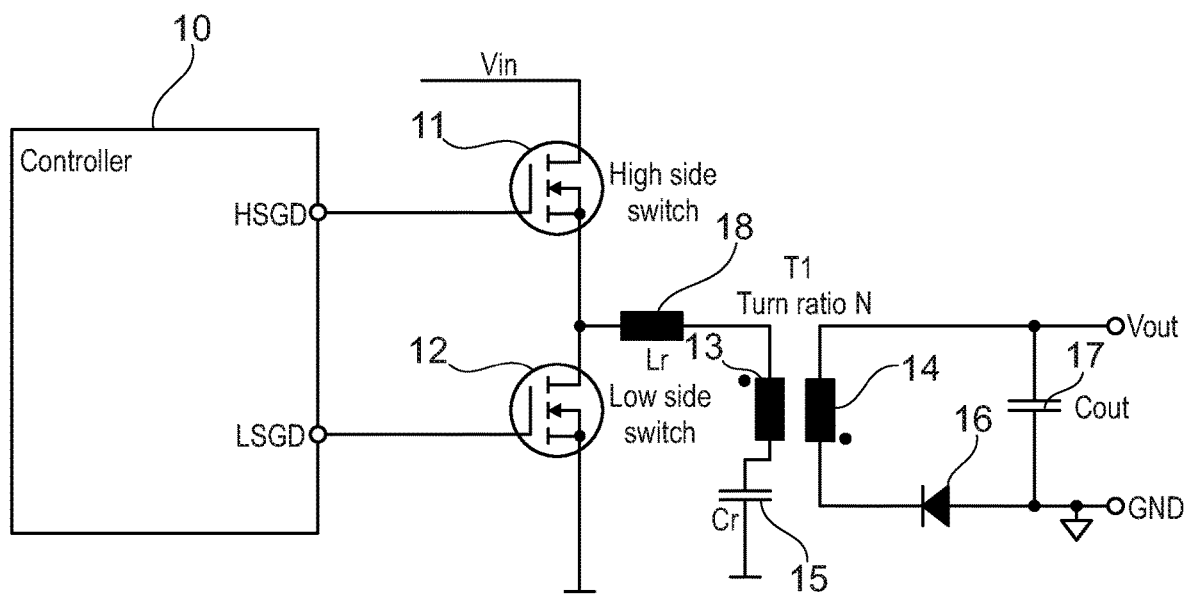
Figure 1C:
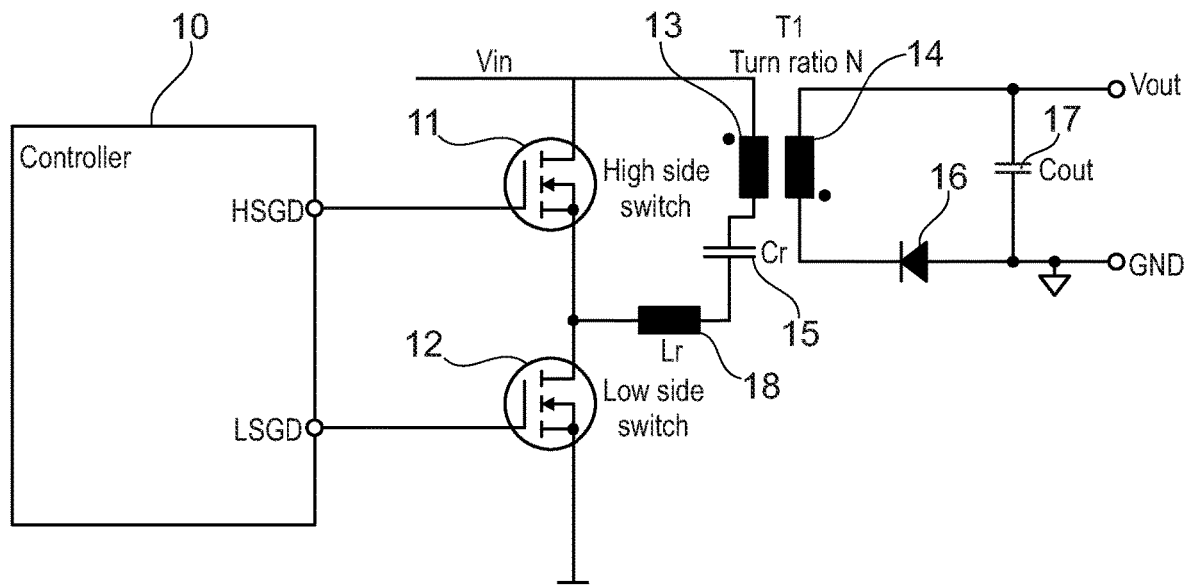

Some variations of the embodiment of FIG. 1A are shown in FIGS. 1B and 1C. In FIGS. 1A-1C, corresponding or like elements bear the same reference numerals and will not be discussed repeatedly.

FIG. 1B shows a variation of the embodiment of FIG. 1A, where an additional inductor 18 having an inductivity Lr is provided coupled between transformer T1 and the node between switches 11, 12. Such an additional inductor 18, which is purely optional, changes a resonance frequency of the above-mentioned LC resonator. Apart from the changed resonance frequency, the explanations given herein also apply to this alternative configuration.

FIG. 1C shows a further alternative configuration. While in FIGS. 1A and 1B, primary winding 13 of transformer T1 and capacitor 15 are coupled in series between the node between switches 11, 12 and ground, in FIG. 1C primary winding 13 and capacitor 15 are coupled between Vin and the node between high-side switch 11 and low-side switch 12. In such a configuration, the roles of high-side switch 11 and low-side switch 12 regarding the control techniques discussed further below may be reversed. Note that in the embodiment of FIG. 1C, additional inductor 18 is provided, but also may be omitted in other embodiments.

Figure 2:
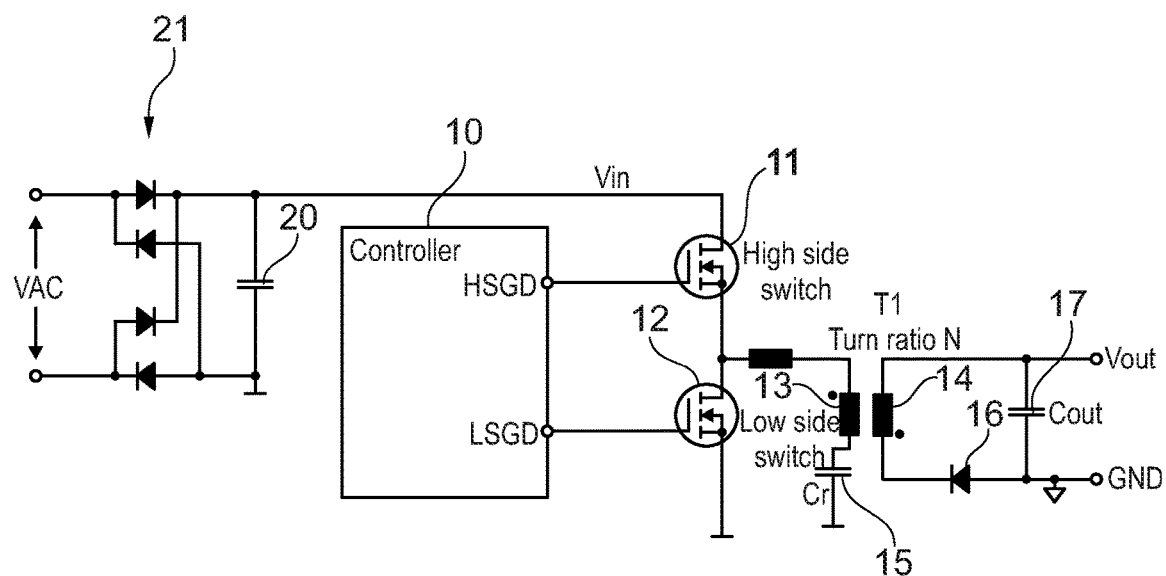
FIG. 2 is a circuit diagram of a APWM HB flyback controller according to a further embodiments.

Before going into more detail regarding implementation examples of controller 10 and associated methods, FIG. 2 illustrates a modification of the embodiment of FIG. 1A for alternating current (AC) input voltages. The embodiment of FIG. 2 is based on the embodiment of FIG. 1A, and like elements bear the same reference numerals.

In FIG. 2, the APWM HB flyback converter receives an AC voltage VAC, which is rectified by a rectifier including a diode arrangement 21 including four diodes and a capacitor 20 for filtering, thus resulting essentially in a DC-like voltage Vin. Instead of the rectifier arrangement shown in FIG. 2, other conventional rectifier arrangements may be used.

Furthermore, apart from the functioning and operation of controller 10, as will be discussed below and other modifications as discussed below, instead of the specific APWM HB flyback converter arrangement shown in FIGS. 1A and 2 including switches 11, 12, transformer T1, capacitor 15, diode 16 and output capacitor 17 other converter topologies may be used, for example the topologies shown in FIG. 1B or 1C.

Figure 3:
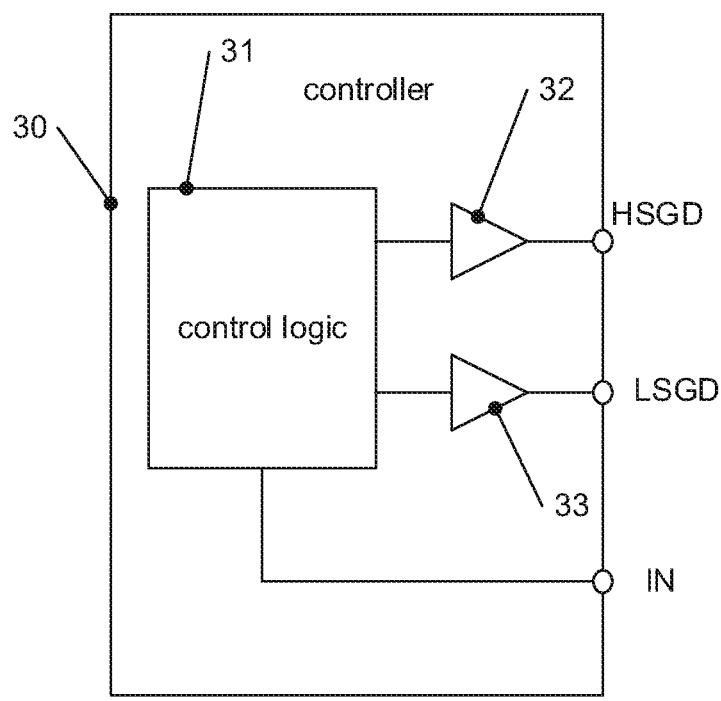
FIG. 3 is a diagram of a controller according to embodiments herein.

FIG. 3 is a schematic diagram of a controller 30 according to an embodiment, which may be used as controller 10 in the embodiments of FIGS. 1 and 2. Controller 30 of FIG. 3 comprises a control logic 31. Control logic 31 may comprise one or more logic circuits, one or more application specific integrated circuits (ASICs), or part thereof, one or more processors and/or other control circuits. Control logic 31 receives one or more input signals IN via one or more input terminals. Input signal(s) IN may for example contain information about an input voltage (for example Vin or VAC of FIG. 1 or 2) or of a required or actual output voltage (for example Vout in FIGS. 1 and 2), or an output signal from an external regulator. Any input signals also used in conventional flyback converters based on which the flyback converter is controlled may be used.

In response to the input signal IN, control logic 31 controls a high-side driver 32 to output control signal HSGD to control a high-side switch (for example high-side switch 11 of FIGS. 1 and 2) and controls a low-side driver 33 to output a control signal LSGD to control a low-side switch (for example low-side switch 12 of FIGS. 1 and 2) to generate a required output voltage. In particular, for operating a APWM HB flyback converter high-side switch 11 and low-side switch 12 are switched on and off in an alternating manner with dead times (times where both switches are off) in between.

Figure 4:
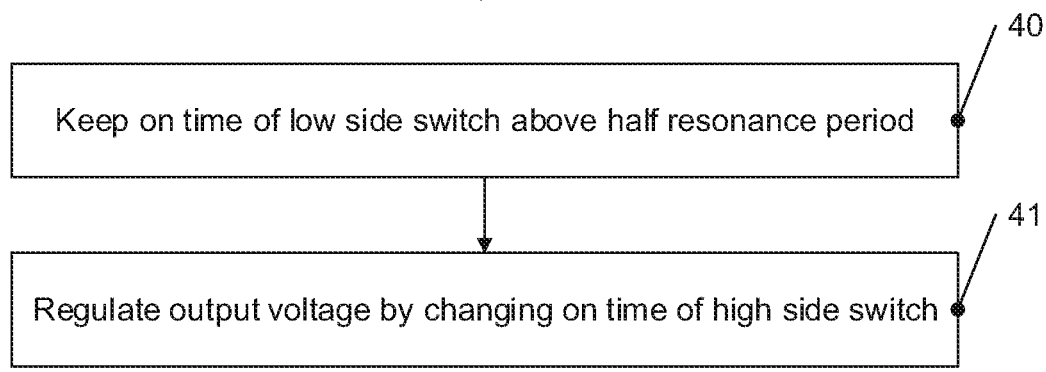
FIG. 4 is a flowchart illustrating a method according to embodiments herein.

FIG. 4 illustrates a method of controlling a high-side switch and a low-side switch of a APWM HB flyback converter which may be implemented by control logic 31 of controller 30. While the method of FIG. 4 is illustrated as a series of acts or events, the order in which these acts or events are shown and described is not to be construed as limiting in any way.

At 40 in FIG. 4, when controlling a high-side switch and a low-side switch of a half bridge of a APWM HB flyback converter, an on-time of a low-side switch is kept at about above half a resonance period of an LC resonance caused for example by a leakage inductivity of transformer T1 and a capacitance of capacitor 15 of FIG. 1A, e.g. at between 70% and 160% of half the resonance period like between 80% and 150% of half the resonance period, or between 95% and 130% of half the resonance period. In some embodiments, this may reduce or eliminate switching off a high-side switch at non-zero voltages or, in other words, may ensure zero-voltage switching.

In some embodiments, the on-time of the low-side switch may be kept constant at about half the LC resonance period. In such embodiments, for regulating the output voltage (for example Vout in FIGS. 1, 2), only the on-time of the high-side switch is changed. This leads to a change of a period length of switching high-side switch and low-side switch.

The control explained with reference to FIG. 4 which may be implemented using controller 30 of FIG. 3 or controller 10 of FIGS. 1 and 2 will now be explained in more detail using simulation examples. It should be noted that these simulation examples and any values given for voltages and currents serve merely as illustrative examples. In particular, the exact behavior of APWM HB flyback converters may vary according to the specific implementation, and the shown curves are therefore to be taken as purely illustrative.

Figure 5:
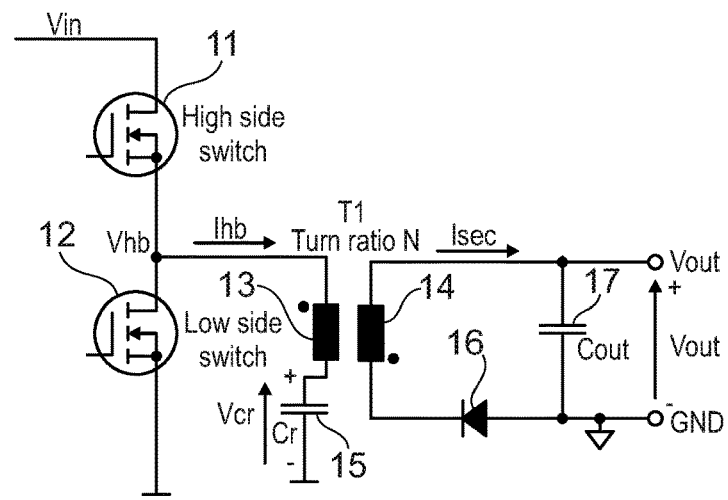
FIG. 5 is a diagram explaining voltages and currents in flyback converters according to embodiments herein.

FIG. 5 reproduces a part of FIGS. 1 and 2 and is used to define currents and voltages shown in the simulation results. A voltage Vhb corresponds to the voltage at the node between high-side switch 11 and low-side switch 12. A current Ihb is the current flowing from this node to primary winding 13. A voltage Vcr is a voltage across capacitor 15. A current Isec is a secondary current flowing from secondary winding 14. Vout denotes the output voltage.

Furthermore, in the following, Im will be used to refer to the magnetizing current of transformer T1, Lm to a magnetizing inductance of transformer T1 and Llk to a leakage inductance of transformer T1. The magnetizing current Im is the current associated with the magnetic flux in the transformer core, in other words, the portion of the transformer input current that leads to magnetic flux. The leakage inductance derives from the electrical property of an imperfectly coupled transformer (i.e. a real transformer) whereby each winding behaves as a self-inductance constant in series with a winding respective ohmic resistance constant, these four winding constants also interacting with the transformers mutual inductance. The leakage inductance is due to leakage field not linking with all turns of the primary and secondary windings. In case an additional inductor like inductor 18 of FIGS. 1 and 2 is provided, for the following explanations this amounts essentially to a change of the effective leakage inductance.

Figure 6:
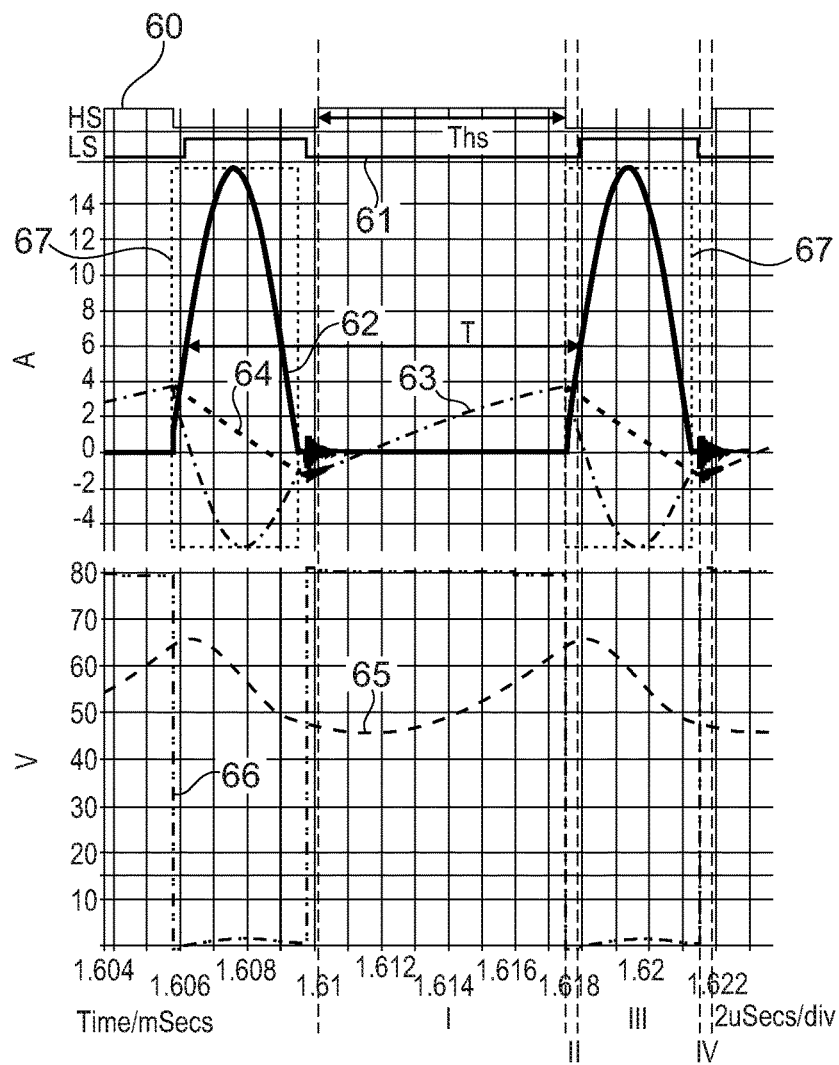
FIGS. 6 to 10 are example diagrams illustrating simulations according to embodiments herein.

FIG. 6 illustrates various of these properties during operation of a APWM HB flyback converter. A curve 60 illustrates switching off the high-side switch 11, and a curve 61 illustrates switching off the low-side switch. As can be seen, high-side switch 11 and low-side switch 12 are switched on and off in an alternating manner periodically. A period length of the switching is denoted T in FIG. 6, and an on-time of the high-side switch is denoted Ths.

A curve 62 illustrates the secondary current Isec, a curve 63 illustrates the current Ihb, a curve 64 illustrates the current Im, a curve 65 illustrates the voltage Vcr and a curve 66 illustrates the voltage Vhb.

Within a box 67, the above-mentioned resonance is visible, most notably in curves 62 (Isec) and 63 (Ihb). Furthermore, as can be seen in curve 66, during the resonance Vhb is non-zero, while being essentially zero at the beginning and end of the resonance.

Before discussing the implications thereof, the operation of the APWM HB flyback converter will be briefly described in a general manner.

Each period T may be divided into four operation phases, labeled I to IV for an example operation in FIG. 6.

In operation phase I, high-side switch 11 is on, and low-side switch 12 is off. Therefore, the input voltage Vin is applied to the first end of primary winding 13 of transformer T1 and to capacitor 15. Current Ihb increases as can be seen in curve 63, and capacitor 15 is charged, leading to increasing Vcr during this period. Current Isec during this period is negligible as during this phase diode D1 is reversed biased.

In operation phase II, both switches 11, 12 are off, also referred to as dead time. The inductance of transformer T1 forces the current built during operation phase I to keep flowing, magnetizing current Im decreasing slowly and current Ihb decreasing more steeply at the beginning of phase II. As both switches 11, 12 are off, voltage Vhb decreases (charging/discharging parasitic capacitances, also referred to as output capacitances, of switches 11, 12) until voltage Vhb is clamped by a parasitic diode of low-side switch 12.

In operation phase III, high-side switch 11 is off while low-side switch 12 is turned on. Vcr continues to decrease. Isec and Ihb show a sinusoidal shape caused by the mentioned resonance. In particular, the voltage in the transformer secondary winding 14 is inverted compared to operation phase I, forward biasing diode 16. Secondary current Isec starts increasing, and this secondary current is reflected to the primary side and added to the magnetizing current.

As can be seen, when low-side switch 12 switches on, zero voltage switching is achieved, as the voltage Vhb is zero when the low-side switch switches on.

In phase IV, both switches 11, 12 are off, also referred to as dead time. Somewhat similar to operation phase II, the current built in transformer T1 forces Vhb to increase until a body diode of high-side switch clamps the voltage. This in embodiments allows zero voltage switching of high-side switch 11 when again going to operation phase I, where high-side switch 11 is turned on.

As mentioned, in embodiments the on-time of the low-side switch is kept at at least half of the resonance period as shown in FIG. 6, for example between 90% of the time of half the resonance period and 120% of half the time of the resonance period. This prevents oscillation and stress while maintaining zero voltage switching. To illustrate this, FIG. 7 illustrates an example behavior in a case where an on-time of the low-side switch is below half the resonance period.

Figure 7:
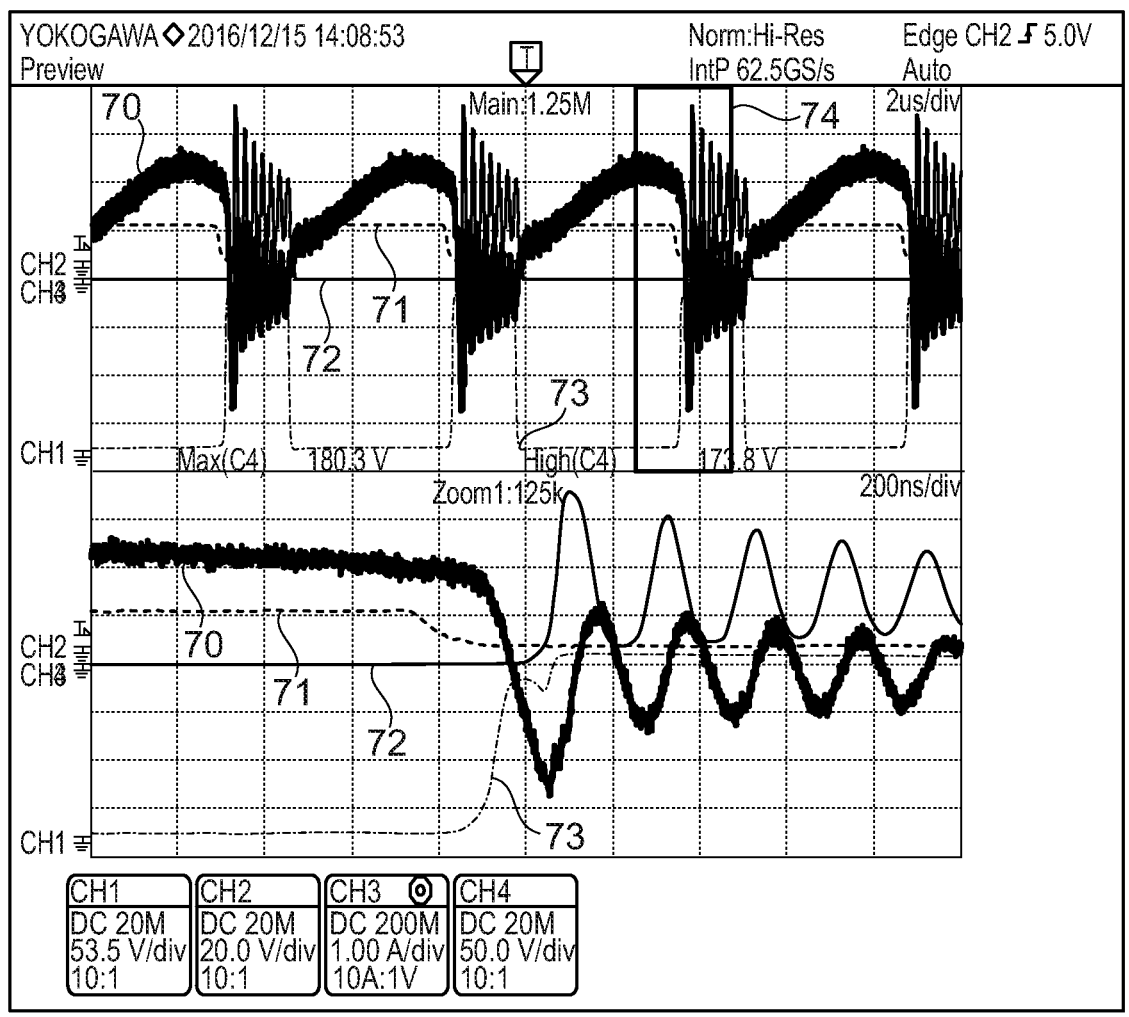

FIG. 7 illustrates simulation results. The lower part of FIG. 7 shows an enlarged version from a box 74 of FIG. 7 of the upper part. A curve 70 shows the current Ihb, a curve 73 illustrates the voltage Vhb, a curve 71 illustrates a gate source voltage of low-side switch 12, and a curve 72 illustrates a voltage across diode 16. As can be seen, when the on-time of the low-side switch drops below half the period length of the oscillation, strong oscillations occur. These oscillations may lead to high circulating currents, high stress on diode 16 and disadvantageous electromagnetic interference (EMI) properties. Therefore, in embodiments as explained with reference to FIG. 4, the on-time of the low-side switch is kept approximately at or slightly above half the resonance period, in particular kept at approximately half the resonance period.

Regulation for different output voltages, as also explained with reference to FIG. 4, and/or regulation for different input voltages while keeping the output voltage constant in embodiments is done by modifying the on-time of the high-side switch only. This will be explained referring to FIG. 6 and further referring to FIG. 8.

FIG. 6 may be seen as an example for generating an output voltage based on a first input voltage, for example an input voltage of 80 V. In the example of FIG. 6, the duty cycle (Ths/T) is 63%.

Figure 8:
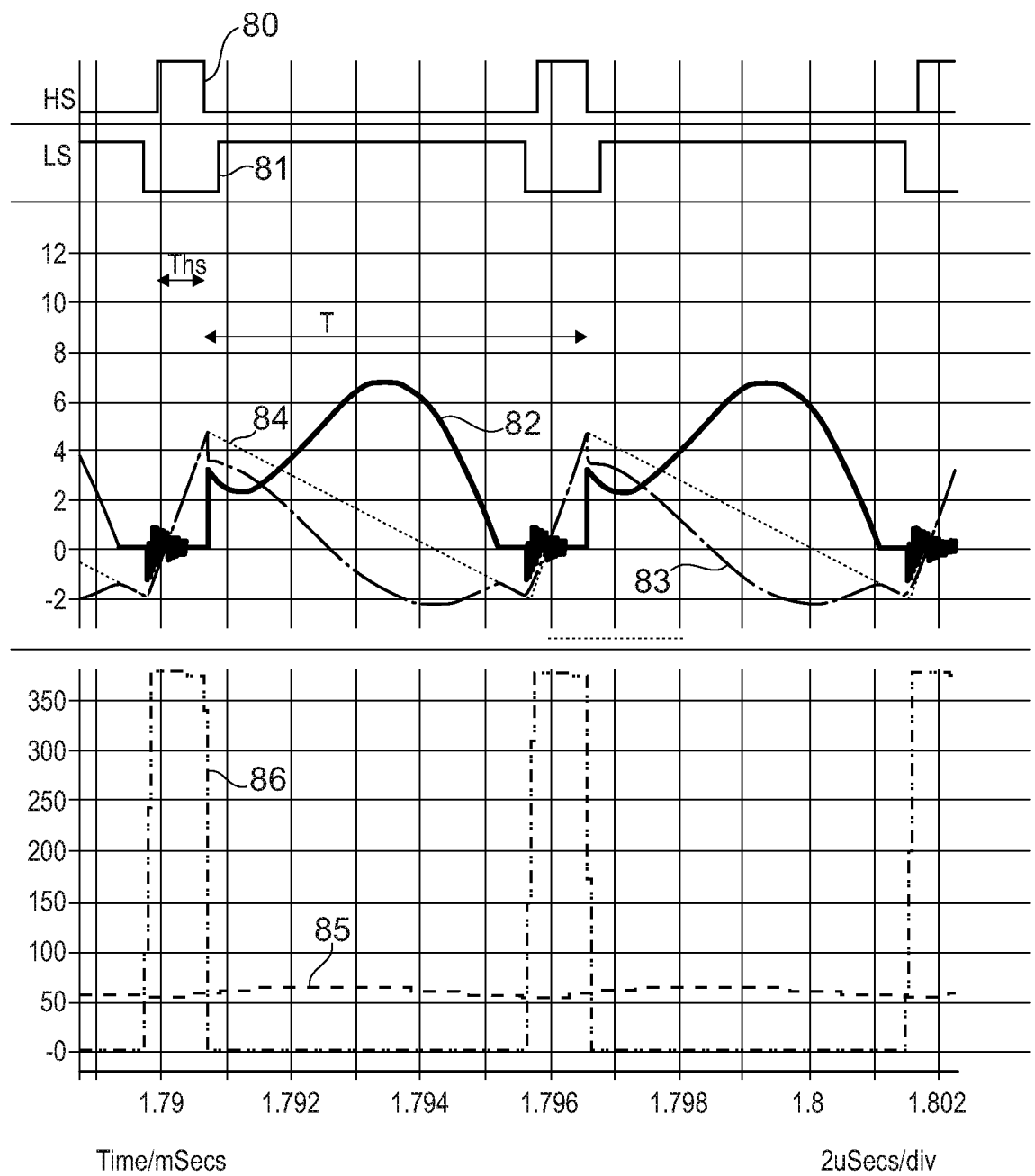

With the same APWM HB flyback converter, if the input voltage increases, the duty cycle needs to be decreased to maintain the same output voltage. FIG. 8 illustrates an example where the input voltage is 374 V, but the same output voltage as in case of FIG. 6 is to be generated. In FIG. 8, curves 80-86 show the same electrical properties (Vhb, Isec, etc.) as curves 60-66 in FIG. 6, respectively. According to an embodiment, the on-time of the low-side switch remains essentially constant, to keep the on-time of the low-side switch at approximately the oscillation period, as explained. The output voltage is directly related to the voltage Vcr reached when charging. In case of FIG. 8, however, the on-time Ths of the high-side switch is decreased, leading to a duty cycle of about 13% in the example of FIG. 8. As the on-time of the low-side switch remains constant, the period length T decreases in this kind of regulation. The output voltage Vout in an APWM HB flyback converter is approximately Vout=Ths*Vin/(T*N), where Vin is the input voltage and N the transformer ratio.

Figure 9A:
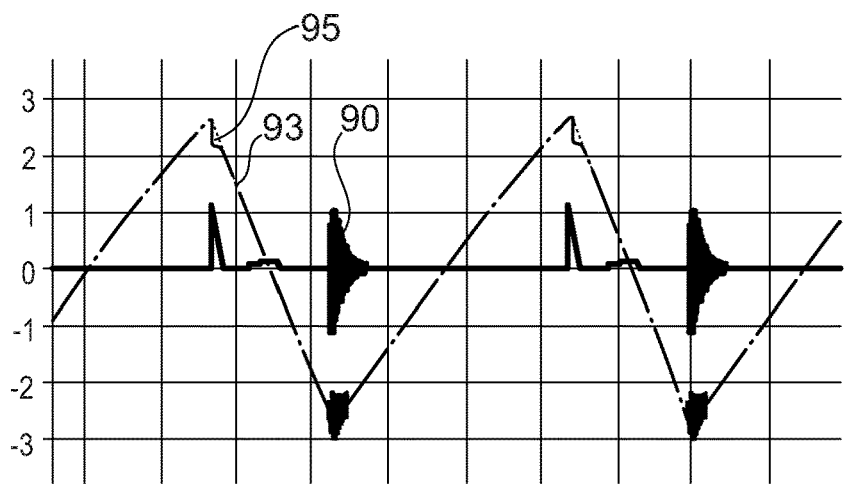
Figure 9B:
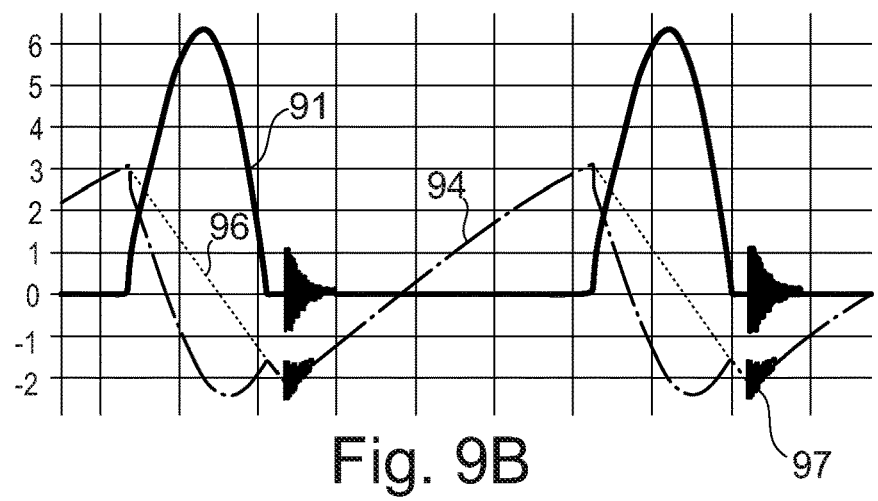
Figure 9C:
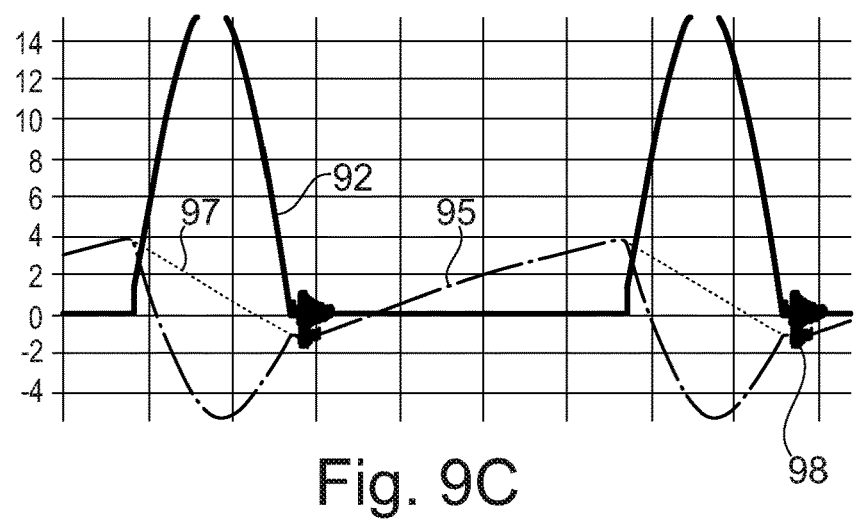

Techniques as discussed herein, in particular the controlling by a controller like controller 30 of FIG. 3 or controller 10 of FIG. 1A-1C or 2 may be used to ensure zero voltage switching for different load conditions. This will now be explained referring to FIGS. 9A-9C. In each of FIGS. 9A-9B, a curve 90 illustrates the secondary current Isec, a curve 93 illustrates the current Ihb, and a curve 95 illustrates the magnetizing current Im. The diagrams in FIGS. 9A-9C show the electrical properties for different load conditions, namely a load of 0 A (no load) in FIG. 9A, meaning that the secondary current according to curve 90 apart from some oscillations is zero, a load of 1.25 A in FIG. 9B and a load of 3.25 A in FIG. 9C.

The reflected secondary current shifts the magnetizing current Im up, depending on the load current load divided by N, where N is the turn ratio between primary and secondary winding of transformer T1. In case of FIG. 9B, the lower peak of the overall current on the primary side is about −2 A (reference numeral 97 in FIG. 9B), and in FIG. 9C this lower peak (reference numeral 98) is −1.2 A or a turn ratio of 2.5, i.e. −2.5 A+1.25 A (the load current)/2.5 (the turn ratio) for FIG. 9B and −2.5 A+3.25 A/2.5 for FIG. 9C. This lower peak magnetizing current Im in embodiments is kept below zero, when the low-side switch switches off and a dead time is observed where high-side and low-side switches are off to ensure zero voltage switching Ideally the output voltage is independent of the load, in practice a small correction of the duty cycle may be required to keep Vout constant in some embodiments.

Above, controlling of the switches for a LC resonator like the one shown in FIGS. 1A, 1B and 2 have been explained. If instead of this configuration the configuration of FIG. 1C is used, the roles of high-side switch and low-side switch in the control scheme may be reversed. For example, in this case an on-time of the high-side switch may be kept constant and/or essentially at or above half a resonance period of the LC resonator, and an on time of the low side switch may be modified to regulate the output voltage.

In some embodiments, a APWM HB flyback converter as illustrated may be used to provide different output voltages depending on an application. In this way, a versatile use of the flyback converter is possible.

As already mentioned with respect to FIG. 4, the output voltage in embodiments is regulated by changing the on-time of the high-side switch. Without further measures, in some cases this may lead to a loss of zero voltage switching in case of very low output voltages and consequently short on-times of the high-side switch, which leads to a low increase of current Ihb. Such low output voltages include a case at start-up where the output voltage starts at 0V and reaches higher voltages only some time after start up. An example for such a situation is illustrated in FIG. 10.

Figure 10:
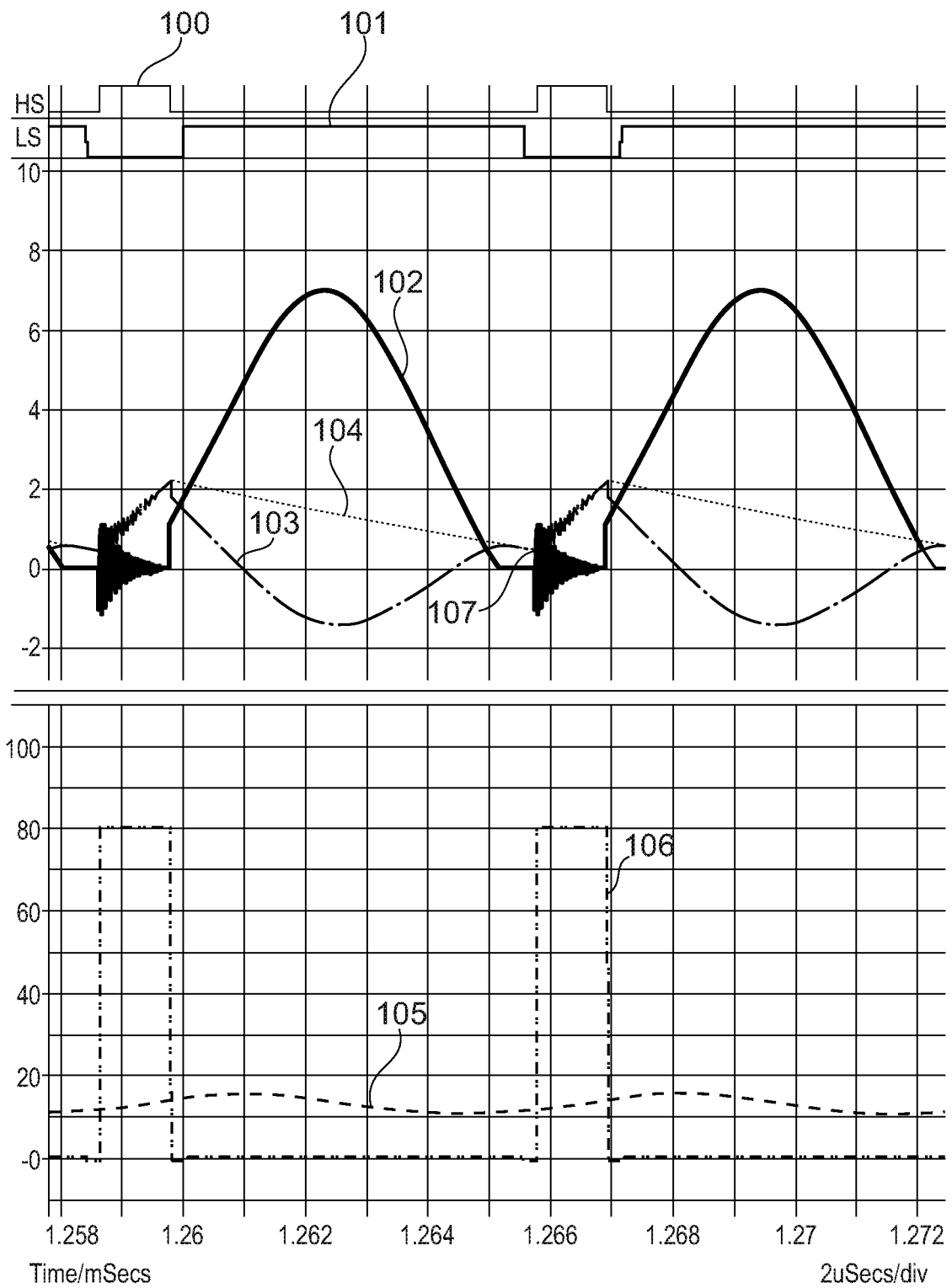

In FIG. 10, a curve 100 illustrates switching off the high-side switch, a curve 101 illustrates switching off the low-side switch, a curve 102 illustrates the secondary current Isec, a curve 103 illustrates current Ihb, a curve 104 illustrates the magnetizing current Im, a curve 106 illustrates voltage Vhb and a curve 105 illustrates voltage Vcr. In the example of FIG. 10, the reflected secondary current shifts the current Im to above 0 A, as indicated for example at 107 in FIG. 10, with a corresponding loss of zero voltage switching. This in some cases may lead to low efficiencies, high electromagnetic interference and/or to risk of damaging the low-side switch in some cases.

Figure 11:
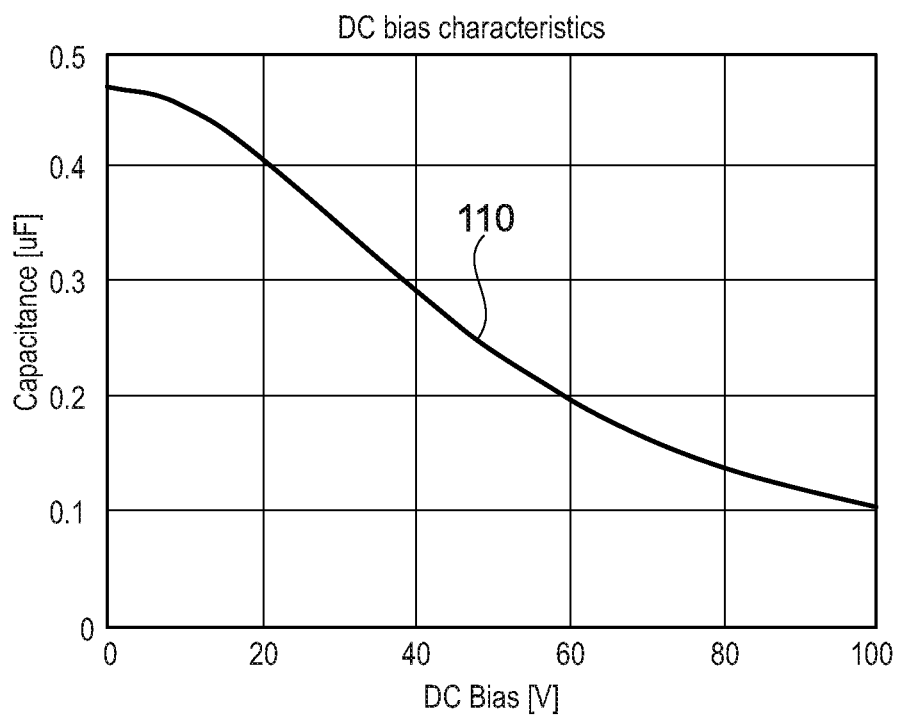
FIG. 11 is an example diagram illustrating a curve characterizing a capacitor according to embodiments herein.
Figure 12:
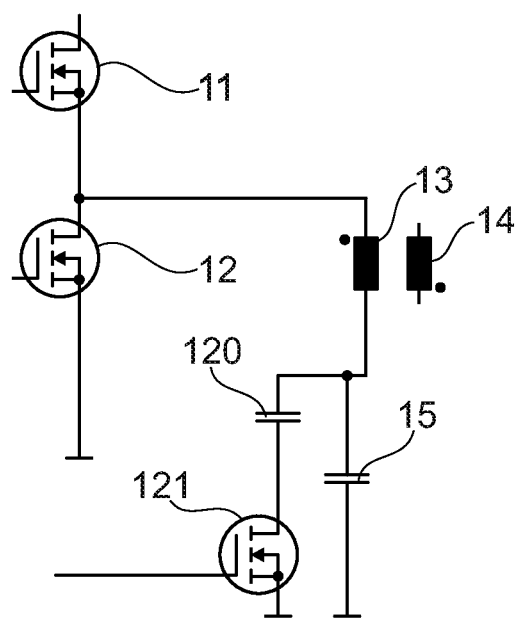
FIG. 12 is a circuit diagram illustrating a part of a APWM HB flyback converter according to embodiments herein.

In an embodiment, in order to avoid or at least mitigate this problem, the resonance frequency of the resonator (formed by the stray inductance Llk and the capacitance Cr of capacitor 15 is explained) is modified. Such a modification may be done by either modifying the leakage inductance Llk (which in practice may be difficult to achieve) or to modify the capacitance value of capacitor 15. In particular, to decrease the resonance frequency and therefore increase the duration of half the resonance period, in embodiments the capacitance is increased for smaller output voltages. In such embodiments, by reducing the resonance frequency a so called circulating current ensures zero voltage switching. Approaches for doing so are illustrated in FIGS. 11 and 12. In other embodiments, for output voltages below a threshold, in addition the on-time of the low-side switch may be increased to about half of the new resonance frequency obtained by increasing the capacitance as discussed above to at least partially improve performance.

In some embodiments, capacitor 15 is implemented as a capacitor having a variable capacitance. Such capacitors are commercially available and may be used in some embodiments to mitigate the above-mentioned problems of loss of zero voltage switching at low output voltages. FIG. 11 illustrates an example curve for a commercially available capacitor usable in some embodiments. In particular, a curve 110 illustrates the capacitance of such a capacitor versus DC bias. As can be seen, the capacitance increases for lower voltages, which behavior may mitigate the above-mentioned effect.

FIG. 12 illustrates a part of a flyback converter according to a further embodiment. Here, parallel to capacitor 15 a further capacitor 120 is switched in series with a switch transistor 121. Switch transistor 121 may be controlled by a controller like controller 30 of FIG. 3 or controller 10 of FIGS. 1 and 2. When the output voltage is below a predetermined threshold value, for example, such that the current increase Ihb during Ths does not allow achieving zero voltage switching anymore and/or such that the Ihb gets close to 0 (but still negative) when low side switch goes off), the controller closes switch transistor 121, such that capacitor 120 becomes effective. By adding parallel capacitor 120, the effective overall capacitance is increased. For higher voltages, switch transistor 121 is switched off, such that only capacitor 15 is active.

Therefore, also in this case, higher capacitances for lower output voltages may be achieved. While a single capacitor 120 is shown in FIG. 12, in other embodiments, a plurality of capacitors in parallel ranges may be provided, which may be selectively activated by corresponding switch transistors.

Figure 13:
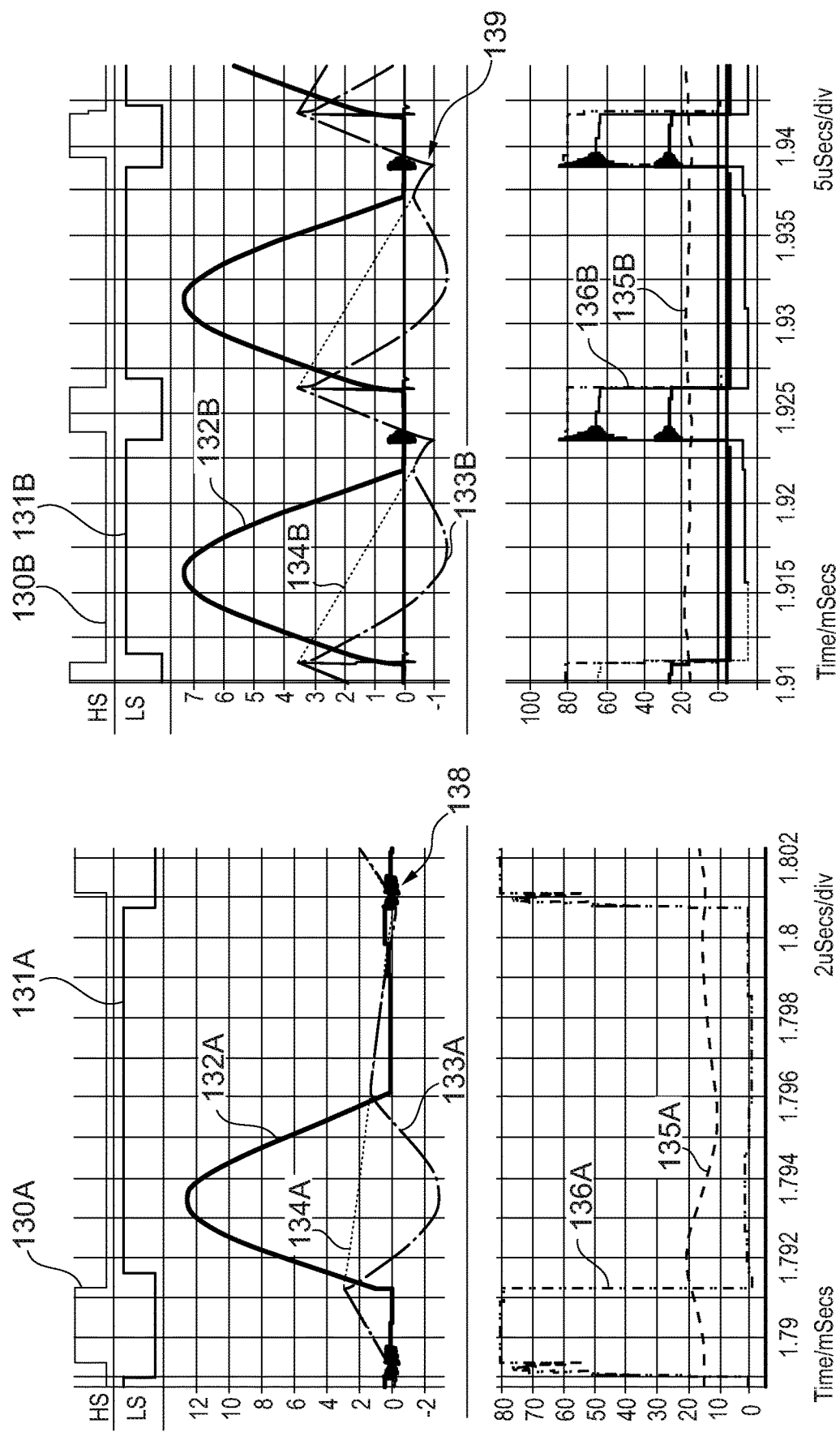
FIGS. 13A and 13B is an example diagram illustrating simulations according to embodiments herein.

The effect of lowering the resonance frequencies for lower output voltages is illustrated in FIGS. 13A and 13B. FIG. 13A illustrates a representation for an operation without increased capacitance. In the specific example of FIGS. 13A and 13B, in FIG. 13A the capacitance Cr is 0.66 µF. Curve 130A illustrates switching of the high-side switch, curve 131A illustrates switching off the low-side switch, curve 132A illustrates the secondary current Isec, curve 133A illustrates Ihb, curve 134A illustrates the magnetizing current Im, curve 135A illustrates Vcr and curve 136A illustrates Vhb. For the comparatively low output voltage of the example of FIGS. 13A and 13B, zero voltage switching may be lost as the current Im may not drop below 0 or only get slightly negative, as indicated by 138 in FIG. 13A. For the simulation example of FIG. 13B, the capacitance value Cr was increased to 3.66 µF. To achieve the same output voltage, this means an increase of the period T increases, corresponding to a reduction of the operating frequency 1/T, which in the example shown was 90 kHz in FIG. 13A and was reduced to 65 kHz in FIG. 13B. Please note the different time scales. In FIG. 13B, curves 130B-135B correspond to curves 130A-135A of FIG. 13A, respectively.

As indicated by 139, in this case Im goes well below 0, and therefore zero voltage switching may be obtained.

Figure 14:
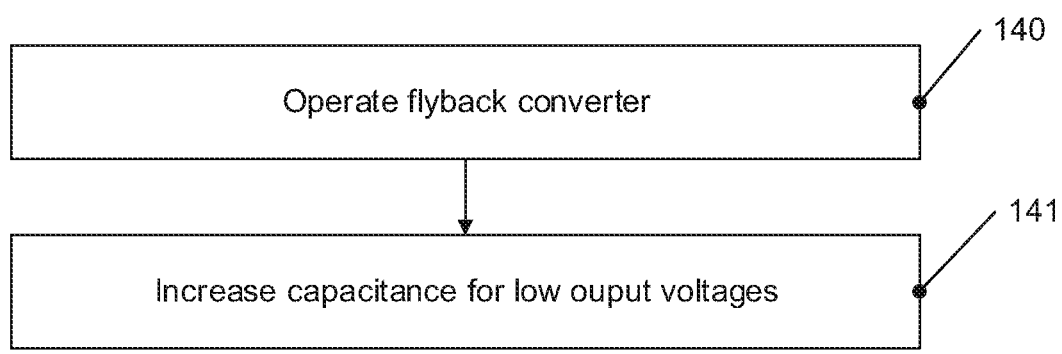
FIG. 14 is a flowchart illustrating a method according to embodiments herein.

FIG. 14 is a flowchart illustrating a method according to an embodiment using the above principles. At 140, the method comprises operating a APWM HB flyback converter by switching a high-side switch and a low-side switch. At 141, the method comprises increasing a capacitance coupled to a primary winding of the transformer (for example capacitance provided by capacitor 15) for low output voltages. This increasing of the capacitance may be for example done by providing a voltage-dependent capacitor as explained referring to FIG. 11, or by activating additional capacitances as illustrated referring to FIG. 12.

It should be noted that the above concept of varying the effective capacitance may not only be applied to capacitor 15 in the configuration of FIGS. 1A and 1B, but also to capacitor 15 of FIG. 1C.

At least some embodiments are defined by the examples given below:

Example 1

A method for operating a flyback converter, comprising:
operating a high-side switch and a low-side switch of the flyback converter, and
keeping an on-time of one of the low-side switch or the high side switch essentially at or above half a resonance period of an LC resonant circuit of the flyback converter.

Example 2

The method of example 1, wherein keeping the on-time of the low-side switch essentially at or above half the resonance period further comprising keeping the on-time of one of the low side switch or high side switch between 70% and 160% of half the resonance period.

Example 3

The method of example 1, further comprising keeping the on-time of the one of the low-side switch or high-side switch constant and regulating an output voltage of the flyback converter by changing an on-time of the other one of the low-side switch or high-side switch.

Example 4

The method of example 1, wherein the on-time of one of the low-side switch or high-side switch and/or a dead time where both low-side switch and high-side switch are off is selected to provide zero voltage switching of the low-side switch or the high-side switch or both.

Example 5

The method of example 1, further comprising varying an overall capacitance coupled to the primary winding depending on a required output voltage.

Example 6

The method of example 5, further comprising varying the on-time of the low-side switch when the overall capacitance is varied to be essentially at or above half a resonance period of the LC resonant circuit including the varied overall capacitance.

Example 7

The method of example 1, wherein the LC resonant circuit comprises one or more of a leakage inductance of a transformer of the flyback converter, a capacitor coupled to a primary winding of the transformer or an additional inductor.

Example 8

A method, comprising:
operating a high-side switch and a low-side switch of a flyback converter, and
increasing a capacitance coupled to a primary winding of a transformer of the flyback converter for lower output voltages compared to the capacitance at higher output voltages.

Example 9

The method of example 8, wherein increasing the capacitance comprises providing a capacitor that varies its capacitance depending on a voltage applied to the capacitor.

Example 10

The method of example 8, wherein increasing the capacitance comprises activating an additional capacitor when the output voltage is below a predefined threshold value.

Example 11

The method of example 9, wherein activating the additional capacitor comprises closing a transistor switch coupled in series to the capacitor.

Example 12

A flyback converter controller, comprising:
a first output configured to output a first control signal for a high-side switch of the flyback converter, a second output configured to output a second control signal for a low-side switch of the flyback converter, and a control logic circuit, wherein the control logic circuit is adapted to control the flyback converter to perform the method of example 1.

Example 13

A flyback converter, comprising:
a controller as defined in example 12,
a high-side switch coupled to first output of the controller,
a low-side switch coupled to a second output of the controller,
a transformer coupled to a node between the high-side switch and the low-side switch, and
a capacitor coupled to a primary winding of the transformer.

Example 14

The flyback converter of example 13, wherein a leakage inductance of the transformer the capacitance and/or an additional inductance define the resonance period.

Example 15

A flyback converter, comprising:
a high-side switch,
a low-side switch, the high-side switch and the low-side switch coupled in series between a voltage input and a reference voltage,
a transformer, wherein a first end of a primary winding of the transformer is coupled to a node between the high-side switch and the low-side switch, and
a capacitor coupled to the primary winding, wherein the capacitor is a variable capacitor configured to vary its capacitance based on a required output voltage of the flyback converter.

Example 16

The flyback converter of example 15, wherein said variable capacitance comprises a capacitor, the capacitance of which decreases with increasing voltage applied to the capacitor.

Example 17

The flyback converter of example 14, wherein said variable capacitance comprises a first capacitance coupled to the second end of the primary winding, and
a series connection of a further switch and a second capacitor coupled in parallel to the first capacitor to the second end of the primary winding.

Example 18

The flyback converter of example 17, further comprising a controller configured to control the further switch when a required output voltage of the flyback converter is below a predefined threshold value.

Example 19

The flyback converter of example 13, further comprising a rectifier circuit coupled to the high-side switch.

In view of the plurality of modifications and variations described above, it is evident that the embodiments shown and described are not to be construed as limiting.

Note again that techniques herein are well suited for use in power converter circuit applications such as those that include multiple phases, multiple DC-DC power converter circuits, semi-resonant DC-DC phases, buck converters, etc. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of operating a flyback converter, the method comprising:
operating a first switch and a second switch of the flyback converter, the first switch and the second switch disposed in series between an input voltage and a reference voltage, the second switch being disposed in parallel with an LC resonant circuit of the flyback converter, the LC resonant circuit comprising a capacitor and an inductor, the inductor being a first winding of a transformer of the flyback converter; and controlling an on-time of the second switch to be greater than half a resonance period of the LC resonant circuit, control of the first switch and the second switch operative to convert the input voltage into an output voltage from a second winding of the transformer;

the method further comprising:

controlling the on-time of the second switch to be greater than half the resonance period for each of multiple control cycles of controlling the first switch and the second switch to produce the output voltage; and regulating the output voltage of the flyback converter by changing an on-time of the first switch coupled to the flyback converter for each of the multiple control cycles.

2. The method as in claim 1, wherein controlling the on-time of the second switch to be greater than half of the resonance period further comprises:

controlling the on-time of the second switch to be between 50% and 80% of the resonance period to produce the output voltage.

3. The method as in claim 1 further comprising:

controlling the on-time of the second switch to be a constant setting for each of multiple control cycles, the constant setting of the on-time being greater than half the resonance period.

4. The method as in claim 3, wherein the on-time of the first switch and a dead time in which both the first switch and the second switch are simultaneously off is selected to provide zero voltage switching.

5. The method as in claim 1 further comprising:

varying a magnitude of capacitance of the capacitor, the capacitor coupled in series with the first winding of the transformer, the magnitude of the capacitance varied depending on a required magnitude of the output voltage.

6. The method as in claim 5 further comprising:

varying the on-time of the second switch when the magnitude of capacitance is varied to provide a half resonance period of the LC resonant circuit.

7. The method as in claim 1, wherein the LC resonant circuit comprises:

a leakage inductance of the transformer of the flyback converter, the capacitor coupled to the first winding of the transformer, and an additional inductor.

8. The method as in claim 1, wherein the first winding is a primary winding of the transformer.

9. The method as in claim 8, wherein the resonance period is defined by a capacitance of the capacitor and an inductance associated with the primary winding.

10. The method as in claim 1, wherein activation of the second switch during the on-time results in resonance of the LC resonant circuit.

11. The method as in claim 1 further comprising:

controlling the on-time of the second switch to provide zero current switching through the second switch.

12. The method as in claim 1, wherein resonance of the LC resonant circuit at a resonance greater than half the resonance period during the second switch being in the ON-state controls a flow of current through the first winding of the flyback converter while the first switch is in an OFF state.

13. The method as in claim 1, wherein the capacitor discharges energy during the on-time of activating the second switch.

14. The method as in claim 13, wherein the capacitor is charged during a condition in which the second switch is set to an OFF state and the first switch is set to an ON state.

15. The method as in claim 1, wherein current through the first winding is sinusoidal during the on-time of the second switch.

16. The method as in claim 1, wherein the on-time of the second switch is greater than 55% of the resonance period to produce the output voltage.

17. The method as in claim 1, wherein the on-time of the first switch and a dead time in which both the first switch and the second switch are simultaneously off is selected to provide zero voltage switching.

18. A method of operating a flyback converter, the method comprising:

operating a first switch and a second switch of the flyback converter, the first switch and the second switch disposed in series between an input voltage and a reference voltage, the second switch being disposed in parallel with an LC resonant circuit of the flyback converter, the LC resonant circuit comprising a capacitor and an inductor, the inductor being a first winding of a transformer of the flyback converter;

controlling an on-time of the second switch to be greater than half a resonance period of the LC resonant circuit, control of the first switch and the second switch operative to convert the input voltage into an output voltage from a second winding of the transformer; and wherein controlling the on-time of the second switch to be greater than half of the resonance period further comprises: controlling the on-time of the second switch to be between 55% and 80% of the resonance period to produce the output voltage.

19. A flyback converter controller comprising:

a first output to output a first control signal applied to a first switch of a flyback converter;

a second output to output a second control signal applied to a second switch of the flyback converter, the first switch and the second switch disposed in series between an input voltage and a reference voltage, the second switch being coupled in parallel with an LC resonant circuit of the flyback converter, the LC resonant circuit comprising a capacitor and an inductor, the inductor being a winding in a transformer of the flyback converter; and a control logic circuit, the control logic circuit operable to:

control the first switch of the flyback converter;

control an on-time of the second switch to be greater than half of a resonance period of the LC resonant circuit of the flyback converter to produce an output voltage; and wherein controlling the on-time of the second switch to be greater than half of the resonance period further comprises:

controlling the on-time of the second switch to be between 55% and 80% of the resonance period to produce the output voltage.

20. The flyback converter as in claim 19, wherein a leakage inductance of the transformer and the capacitance contribute to defining a magnitude of the resonance period.

21. A method of operating a flyback converter, the method comprising:

operating a first switch and a second switch of the flyback converter, wherein the second switch is coupled in parallel with an LC resonant circuit of the flyback converter, the first switch and the second switch disposed in series between an input voltage and a reference voltage, the LC resonant circuit comprising a capacitor and an inductor, the inductor being a winding in the flyback converter, the flyback converter operative to convert the input voltage into an output voltage; and
controlling an on-time of the second -switch to be between 55% and 80% of a resonance period of the LC resonant circuit to produce the output voltage.

* * * * *